US006219367B1

(12) United States Patent
Atsumi

(10) Patent No.: US 6,219,367 B1
(45) Date of Patent: Apr. 17, 2001

(54) METHOD FOR DETERMINING LIFE OF LASER LIGHT SOURCE

(75) Inventor: Shinobu Atsumi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/049,096

(22) Filed: Mar. 27, 1998

(30) Foreign Application Priority Data

Mar. 28, 1997 (JP) .................................................... 9-094826

(51) Int. Cl.⁷ ...................................................... H10S 3/223
(52) U.S. Cl. ................................... 372/59; 372/58; 372/59
(58) Field of Search ........................................ 372/58–59

(56) References Cited

U.S. PATENT DOCUMENTS

| | | |
|---|---|---|
| 5,010,230 | 4/1991 | Uemura . |
| 5,097,291 | * 3/1992 | Suzuki ..................................... 355/69 |
| 5,260,961 | * 11/1993 | Zhou et al. .............................. 372/57 |
| 5,383,217 | 1/1995 | Uemura . |
| 5,719,675 | * 2/1998 | Killpatrick et al. .................. 356/350 |

FOREIGN PATENT DOCUMENTS

| | | |
|---|---|---|
| 410173274 | * 6/1998 | (JP) . |
| 410275951 | * 10/1998 | (JP) . |

* cited by examiner

Primary Examiner—Frank G. Font
Assistant Examiner—Delma R. Flores Ruiz
(74) Attorney, Agent, or Firm—Armstrong Westerman Hattori McLeland & Naughton, LLP

(57) ABSTRACT

In a method for determining the life of a laser light source for use with an exposure apparatus using KrF or ArF excimer laser as a light source for exposure, the method for determining the life of the laser light source is implemented by subjecting an excimer laser light source to single oscillation by blocking a pulse light, acquiring data relating to plural parameters for learning a periodical variation of the excimer laser light source and its structuring parts through an interface, and determining the life of the excimer laser light source on the basis of the data acquired. Those data is acquired on a regular basis in accompany with the work for exchanging gases at the time of exchanging gases for the excimer laser light source.

18 Claims, 2 Drawing Sheets

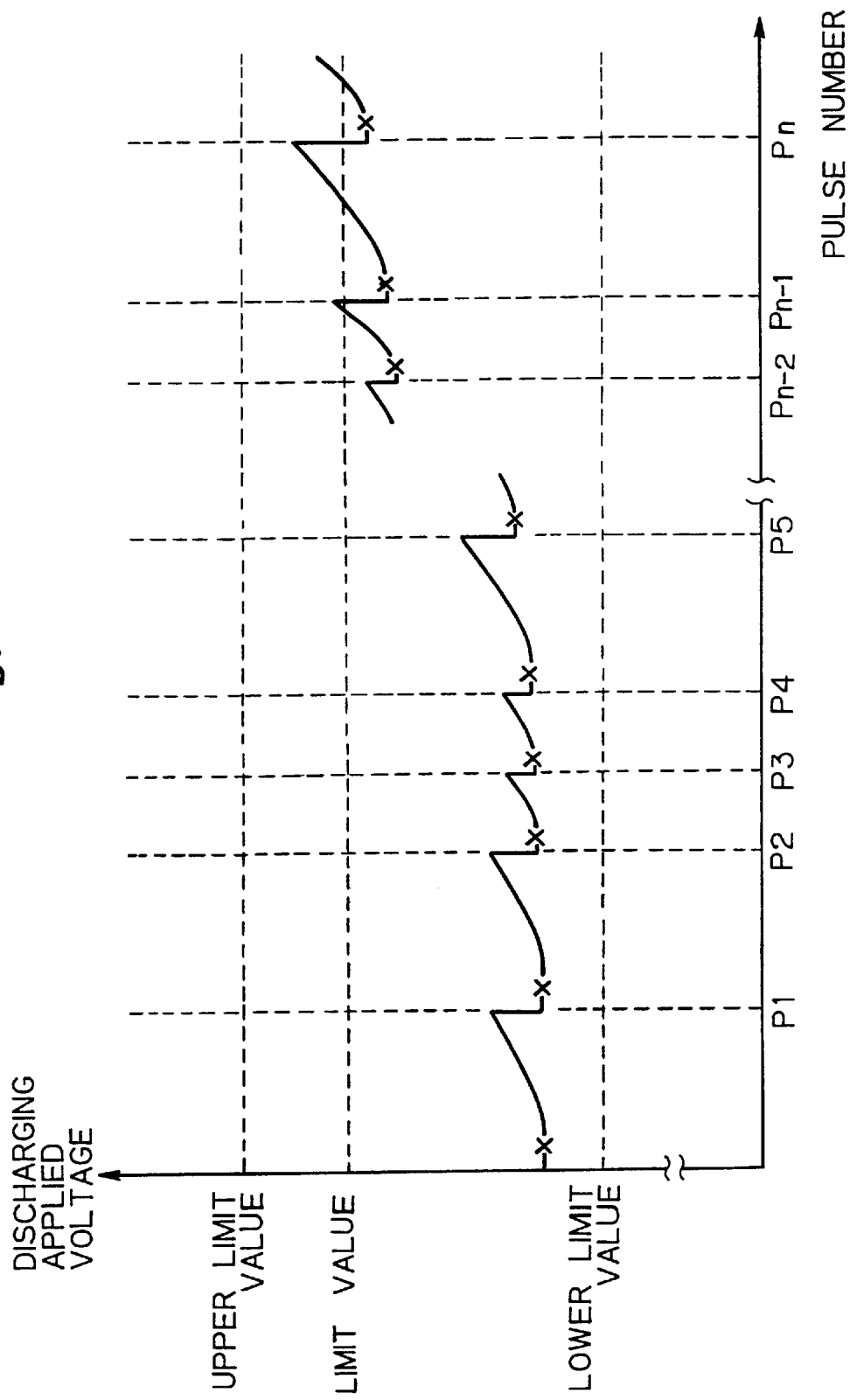

METHOD FOR DETERMINING LIFE OF LASER LIGHT SOURCE

BACKGROUND OF THE INVENTION

The present invention relates to a method for determining the life of a laser light source for use with an exposure apparatus and a light source thereof to be used in a photolithography process for the manufacture of semiconductor devices, liquid crystal display units, thin film magnetic heads and so on and, more particularly, to a method for determining the life of an excimer laser light source, particularly such as KrF or ArF, etc.

In recent years, as integration of semiconductor devices is improved, there is the tendency that the width of the minimum pattern line of a circuit tends to become narrower. In order to compete with such tendency, excimer laser beams have been employed as a light source for exposure of exposure apparatuseses, in place of mercury lamps which had so far been used primarily for a light source for exposure. The exposure apparatus using excimer laser beams comprises an excimer laser light source and a main body of the exposure apparatus. The excimer laser light source is connected to the main body of the exposure apparatus through an interface cable, such as optical fiber, etc., and designed so as to emit laser beams in accordance with a sequence of control units on the main body side of the exposure apparatus.

Excimer lasers can generate laser beams as pulse light in the order of nanoseconds by the reaction of halogen gases with inert gases by way of discharging in a laser chamber in which a mixture of three kinds of gases are generally filled, including halogen gases such as fluorine gases, etc., inert gases such as krypton or argon gases, etc. and rare gases such as helium or neon gases, etc.

Upon generating laser beams in a repetitive way, the problems may arise that the concentration of the halogen gases may be decreased and consequently a decrease in pulse energy of the laser may be caused due to the connection of the halogen gases to impurities produced in the chamber or adsorption thereof to an inner side of the chamber and further that this may cause a deterioration of each of the structuring parts of the excimer laser light source. Moreover, as ultraviolet light of a high light intensity may also be caused to emit, a window through which to pass the laser beams and a beam splitter, etc. may also cause deteriorating.

Where the excimer laser beams are used as the light source for the semiconductor exposure apparatus, a variation in pulse energy may suffer from inconveniences and difficulties that the accuracy of controlling an mount of exposure onto a photosensitive substrate is reduced, the function of reducing an interference fringe on the photosensitive substrate resulting from an optical system is decreased, or a S/N ratio of signals of a photoelectrical detection system such as a pulse energy monitor system or of an alignment system is decreased, etc. In order to fail to cause such inconveniences and difficulties and to sustain the pulse energy at a constant level, the excimer laser beams undergo feedback to discharging applied voltage, while monitoring the pulse energy that decreases upon a reduction of the concentration of the gases, and the discharging applied voltage is gradually increased. Further, as there is the upper limit of the discharging applied voltage, the gases are exchanged upon reaching the applied voltage to its upper limit in order to return the concentration of the gases to its appropriate value, thereby causing the applied voltage to decrease and sustaining the pulse energy at a constant level.

The deterioration of each of the structuring parts of the excimer laser light source is managed on the basis of the number of emission pulses of the excimer laser beams so that, when the number of the emission pulses thereof has reached a predetermined value, it is decided that the main body of the excimer laser light source or each of the structuring parts thereof is to be exchanged as the life of the main body of the excimer laser light source or each of the structuring parts thereof would have expired. The number of the emission pulses is usually managed on the basis of the counts thereof measured within the excimer laser light source. For example, when the number of emission pulses measured reaches 90% of the pulse number predetermined as an expiration of the life, the excimer laser light source is designed to generate a maintenance request signal of a request for maintenance through an interface to a control unit on the side of the exposure apparatus, thereby giving information that the life of the laser light source or the structuring parts thereof is approaching and expires within short. The pulse number for determining the life of the excimer laser light source or the structuring parts thereof may be predetermined by estimating the life thereof, for example, on the basis of a specification made by a manufacturer of the excimer laser light source or on the basis of the results of tolerance tests based on management standards on the side of a user who uses excimer laser beams as a light source for the exposure apparatus or from the results of accumulated experiences upon using the excimer laser light source, etc.

Generally, however, a laser oscillator of a type in which gases are filled in a laser chamber and the light is activated has a variation in the life with each laser oscillator to some extent. A similar tendency can be seen in excimer laser. As the excimer laser light source uses fluorine gases having a very high reactivity and ability to cause corrosion as well as oscillates ultraviolet light having a high irradiation energy, the life of the structuring parts of the excimer laser light source may therefore vary not only with the frequency of uses of excimer laser beams but also with other various conditions for usage. Thus, the management of the life of the excimer laser light source and the structuring parts thereof only on the basis of the number of the emission pulses can be said to simply understand a rough time of the life with the frequency of uses of the excimer laser light source alone taken into account.

In instances where the life of the excimer laser light source or the structuring parts thereof loaded in the exposure apparatus is managed simply on the basis of the number of the emission pulses in the manner as described hereinabove, there may be caused the occasions that either of the main body of the excimer laser light source or the structuring parts thereof has been determined as deteriorating and as reaching its life by the number of the emission pulses that is actually smaller than the number of the emission pulses predetermined as having reached its life, thereby causing a forcible termination of operating the exposure apparatus at an unexpected time or causing useless exchanges of the excimer laser light source or its structuring parts even if their performance may not yet deteriorate and they can still be used up to the number of the emission pulses exceeding the pulse number determined to have reached the life thereof. These may cause a decrease in throughputs of the exposure apparatus and an increase in costs for manufacturing the exposure apparatuses.

SUMMARY OF THE INVENTION

The object of the present invention is to provide a method for determining the life of a laser light source for use as an exposure light source of an exposure apparatus.

The present invention has another object to provide a method for maintaining a laser light source so adapted as to implement an optimized maintenance of the laser light source for use with an exposure apparatus.

The present invention has a further object to provide an exposure apparatus so adapted as to allow the laser light source to be effected to maintenance at an optimized timing.

The objects according to the present invention can be achieved by a method for determining the life of a laser light source for emitting laser light, which is characterized by the step of acquiring information for learning a periodical variation in the laser light source, and the step of estimating the life of the laser light source on the basis of the information acquired. In the method for determining the life of the laser light source according to the present invention, it is preferred that the information is acquired on a regular basis. Further, the information is acquired preferably concomitantly with exchanging gases of the laser light source.

Moreover, the information is characterized in that, when the laser light is pulse light, it includes at least one of high voltage to be applied to a discharging electrode of the laser light source, a spectrum line width of pulse light, stability of the pulse energy of the pulse light, and an emission number of the pulse light.

Also, in the method for determining the life of the laser light source according to the present invention, the life of the laser light source is characterized by determination thereof on the basis of a comparison of the value of the information with the predetermined limit value.

In accordance with the present invention, the inspection for maintenance of, for example, parts can be implemented at the optimal timing, as a variety of data suitable for use in the determination of the life of the laser light source and the parts thereof can be acquired and it is decided to determine whether the value of the data exceeds the predetermined limit value. Further, the data can be acquired always under the same conditions by setting the data so as to be regularly acquired immediately after the exchange of the gases.

Moreover, the method for determining the life of the laser light source according to the present invention can avoid an occurrence of the situation in which it is decided that the laser light source reaches its life at the unexpected time and the operation of the exposure apparatus should accordingly be terminated. In addition, as it is possible to estimating the timing when the data for use in determining the life of the parts of the laser light source will reach the limit value, a schedule of inspection and maintenance can be set in advance. Furthermore, as the parts of the laser light source and the structuring parts thereof required for maintenance can readily be predetermined, the period of time during which the exposure apparatus is being operated in a likely trouble-causing state can be shortened.

BRIEF DESCRIPTION OF THE DRAWINGS

The above and other objects, features and advantages of the present invention will be apparent from the following detailed description of the preferred embodiments thereof, reference being made to the accompanying drawings, in which:

FIG. 2 is a view for describing a method for estimating a timing of determining a limit value in the method for determining the life of a laser light source in accordance with an embodiment of the present invention.

DESCRIPTION OF THE PREFERRED EMBODIMENTS

Figure 1:
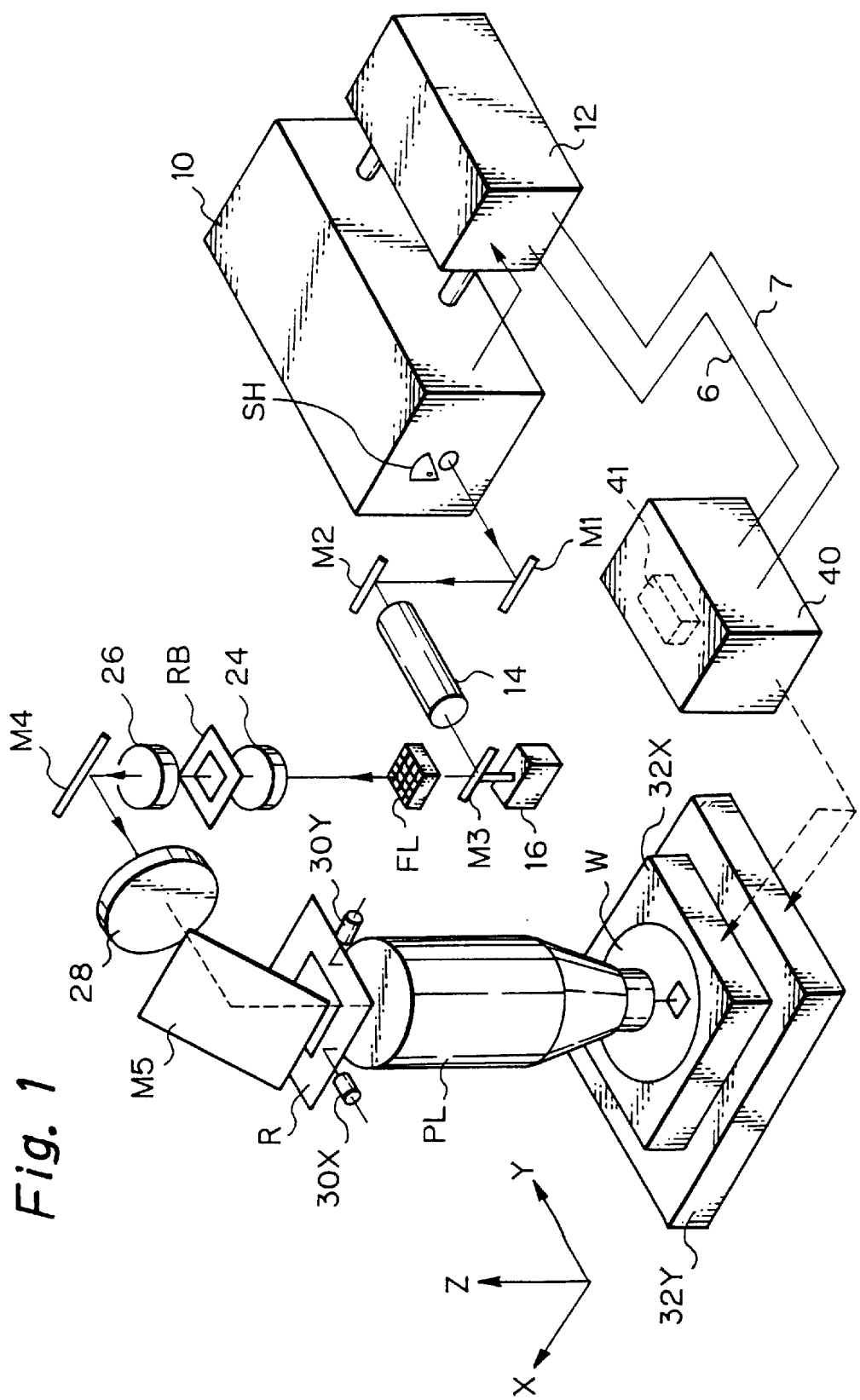
FIG. 1 is a perspective view showing an entire structure of an exposure apparatus according to an embodiment of the present invention.

The method for determining the life of a laser light source according to an embodiment of the present invention will be described in more detail by way of example with reference to FIGS. 1 and 2.

FIG. 1 is a perspective view showing the overall structure of the exposure apparatus in accordance with an embodiment of the present invention. The exposure apparatus is disclosed, for example, in U.S. Pat. No. 5,383,217 which in turn is incorporated herein by reference.

As shown in FIG. 1, the exposure apparatus may comprise a main body part of an excimer laser light source 10 having a laser chamber in which a mixture of gases, such as rare gases, halide gases, etc. is filled, a semitransparent front mirror constituting a resonator, a narrow-banding module for narrow-banding the wavelength of exposure light, including a refractory lattice, prism, etalon or the like, a monitor module such as a spectroscope for monitoring stability of the wavelength of exposure light or the width of the spectrum thereof or a detector for monitoring a laser power, and a shutter SH. The operation for exchanging gases in the laser chamber, the control for stabilizing the wavelength of laser light or the control over the voltage to be applied by discharging, etc. may be carried out usually by a control unit 12. In this embodiment of the present invention, however, the control is so arranged as to be carried out on the basis of an instruction or a request signal from a main control unit 40 on the side of the main body of the exposure apparatus without implementation of the control by the control unit 12 alone as a single body.

The pulse light from the excimer laser light source 10 may be formed into a predetermined shape in section and size by incidence onto an optical system 14 for shaping the laser beams through a movable mirror M1 and a fixed mirror M2. The pulse light from the optical system 14 for shaping the beams is reflected by a drive part 16 on an oscillating mirror M3 disposed so as to oscillate at a predetermined angle and then strikes a flyeye lens FL acting as an optical integrator, thereby converting the incident light into a number of secondary light sources (spot lights). Each spot light of excimer laser beams formed on the outgoing side of each element lens of the flyeye lens FL is gathered and superimposed by a condenser lens system 24 so as to provide a distribution having a substantially uniform intensity on a reticle blind (illumination field diaphragm) RB.

The excimer laser beams passed through the reticle blind RB are illuminating a circuit pattern area of a reticle R through a lens system 26, a fixed mirror M4, a main condenser lens 28 and a fixed mirror M5. The reticle blind RB is so arranged as to become conjugate with the reticle R by the aid of the lens system 26 and the main condenser lens 28. The reticle R is aligned in directions X, Y and θ with the main body of the exposure apparatus by reticle alignment systems 30X and 30Y disposed for exclusive use. An image of the circuit pattern of the reticle R is projected in a compressed manner onto a wafer W by a projection lens PL. The wafer W is placed on an X-stage 32X and the X-stage 32X is disposed so as to move in the X-direction on a Y-stage 32Y which in turn is disposed so as to move in the Y-direction on a base. This allows a two-dimensional movement of the wafer W on a plane of a projecting image and an exposure in a step-and-repeat system.

With the above arrangement, a partition wall (not shown) of a thermal chamber for accommodating the main body of the exposure apparatus is interposed between the movable mirror M1 and the laser light source 10 and the laser light source 10 is disposed outside the thermal chamber. The main control unit 40 is disposed so as to implement the movement of the X-stage 32X and the Y-stage 32Y of the exposure apparatus, the alignment of the reticle R by means of the reticle alignment systems 30X and 30Y, the detection of the position of the wafer W by a wafer alignment system (not shown), the operation of the exposure apparatus, the setting of the reticle blind RB, the operation for controlling the amount of exposure using an optoectrical element (not shown), the operation for reducing the spectrum by oscillation of the oscillating mirror M3 so as to reduce an interference fringe or the like to be caused by the interfering ability of excimer laser beams, and the like.

Two interfaces 6 and 7 are interposed between the main control unit 40 on the exposure apparatus side and the control unit 12 on the laser light source side. Through the two interfaces 6 and 7, the main control unit 40 is disposed so as to implement all operations of the excimer laser light source 10. For example, the main control unit 40 on the main body side of the exposure apparatus can transmit a variety of signals to the control unit 12 of the light source 12 of the laser light source 10 through the interface 6, which signals may include luminous trigger signals, signals for initiating discharging high voltage, signals for initiating oscillation, signals for terminating oscillation, and so on. On the other hand, the control unit 12 of the laser light source 10 can transmit a variety of signals to the main control unit 40 through the interface 6, which signals may include signals for completing the standby of oscillation, signals representative of the position of an inner shutter, signals indicative of interlocking, and so on.

The interface 7 is used primarily to send and receive a variety of signals between the main control unit 40 and the control unit 12, the signals being required for effecting the method for determining the life of the laser light source according to the embodiment of the present invention.

Then, a description will be made of the method for determining the life of the laser light source according to the embodiment of the present invention with reference to Table 1 which in turn is representative of a flow of signals sent and received between the main control unit 40 and the control unit 12 of the laser light source 10 and processes to be carried out on the laser light source 10 side.

TABLE 1

| Direction of Signals Exposure Apparatus - Excimer Laser | Signals | Action of Excimer Lasers |
| --- | --- | --- |
| ← | Request for exchanging gas | |
| → | Start of exchanging gas | |
| | | Exchanging laser gases |
| ← | End of exchanging gas | |
| → | Start of single oscillation of laser | |
| | | Single-oscillating laser |
| → | Request for data acquisition | |
| | | Acquiring laser data |
| ← | End of data acquisition | |
| → | Request for sending data | |
| | | Sending laser data |

TABLE 1-continued

| Direction of Signals Exposure Apparatus - Excimer Laser | Signals | Action of Excimer Lasers |
| --- | --- | --- |
| → | Stop of laser oscillation | |
| | | Comparing data acquired in exposure apparatus vs. set value |

First, a gas exchange request signal for calling for the exchange of gases in the laser chamber of the laser light source 10 is sent from the control unit 12 to the main control unit 40 of the exposure apparatus through the interface 6 (or 7). The main control unit 40 sends a gas exchange signal for exchanging gases to the control unit 12 of the laser light source 10 through the interface 7 after waiting for terminating the operation of exposure to the wafer by the exposure apparatus, thereby implementing the exchange of gases for the excimer laser light source 10. The exchange of the gases may be carried out manually or automatically by the control with the main control unit 40 of the exposure apparatus. When the exchange of the gases is to be carried out automatically, the convenient and appropriate timing can be selected on a sequence of exposure. The gases may be exchanged at the timing, for example, when the action of exposure to a certain shot area located on the wafer is transferred to the action of exposure to the next shot area or when the action of exposure to one sheet of a wafer has been finished or when the action of exposure to a lot unit of wafers has been finished and the action of exposure to the next lot unit of waters is ready to be made. Once the exchange of gases has been completed, the control unit 12 of the laser light source 10 sends the signal indicative of the completion of the exchange of gases to the main control unit 40 on the exposure apparatus side.

Thereafter, the main control unit 40 sends to the control unit 12 the signal indicative of the start of single oscillation of an excimer laser, followed by closing the shutter SH upon receipt of the signal and then allowing the laser light source 10 to start the single oscillation thereof. Then, the signal for acquiring data is sent from the main control unit 40 of the exposure apparatus to the control unit 12 of the laser light source 10. In response to the data acquisition signal, the control unit 12 acquires the data from the laser light source 10 being single-oscillated, such as, for example, a high voltage value (HV) to be applied to the discharging electrode of the laser light source, a spectral width of the laser light emitting the pulse light, stability of the pulse energy of the pulse light, and the pulse number (the number of the pulse light emitted) as an indicator for the life of the structuring parts of the excimer laser light source 10.

Upon finishing the acquisition of the data in the manner as described hereinabove, the control unit 12 of the laser light source 10 then sends the signal indicative of the end of the data acquisition to the main control unit 40 on the exposure apparatus side. In response to the data acquisition end signal, the main control unit 40 then sends the signal for transmitting the data to the control unit 12 of the laser light source 10. Thereafter, the control unit 12 sends the acquired data to the main control unit 40. The transmission and receipt of the data may be effected whenever each of the data has been acquired or once collectively when the entire data has been acquired in the manner as in this embodiment of the present invention. After the data has been received, the main control unit 40 sends the signal for stopping the single oscillation of the laser to the control unit 12 of the laser light source 10, thereby allowing the control unit 12 to terminate the single oscillation of the laser.

The main control unit 40 is so disposed as to compare each of the received data with each of the limit values corresponding to each of the data preset and stored in a memory device of the main control unit 40. Each of the limit values is set as a value that is not the value required for exchanging each of the parts and that amounts to approximately 90% of the value required for exchanging each of the parts. Further, the memory device of the main control unit 40 is stored with a table as indicated in Table 2 and the main control unit 40 is so disposed as to determine the life of the laser light source and the structuring parts thereof on the basis of the results of comparison.

TABLE 2

|  | Chamber | Narrow-banding Module | Window/Front mirror | Beam Splitter | Monitor module |
|---|---|---|---|---|---|
| Voltage | X | X | X | X |  |
| Stability of energy | X | X | X | X |  |
| Spectrum width |  | X | X | X | X |
| Life (Pulse Number) | X | X | X | X | X |

Table 2 is an example of tables so adapted as to determine the possibility as to whether the life of the main body (chamber) of the laser light source 10 and the structuring parts thereof has amounted to the timing for exchanging them when each of the acquired data has reached each of the limit values. In Table 2, for example, if the acquired voltage value (HV) or the acquired value of stability of energy would exceed the limit value, Table 2 indicates the possibility that the life of each of the chamber, narrow-banding module, window/front mirror and beam splitter is coming soon.

Further, if the spectrum width would reach the limit value, there is the possibility that the life of at least either of the narrow-banding module, window/front mirror, beam splitter or monitor module is coming to expire within short. If the voltage value and the stability of energy would not reach their respective limit values, there is the high possibility that the life of the monitor module is approaching and coming to expire soon. It is to be noted herein that the predetermined limit value of each parameter is obtained in advance as a result of simulations of various conditions or the like. In this embodiment according to the present invention, the pulse number is also acquired as an indicator for the timing of determining the life.

In the method for determining the life of the laser light source according to this embodiment of the present invention in the manner as described hereinabove, a plurality of the parameters are set for determining the life thereof, each of the data of the parameters is acquired on a regular basis and it is then compared with the predetermined limit value corresponding thereto, thereby effecting the determination of the life of the laser light source and the structuring parts thereof.

Also, the main control unit 40 may be disposed so as to post a maintenance request for implementing the maintenance and inspection of the laser light source 10 or for exchanging the parts to an operator through a display device or the like of the exposure apparatus from the main control unit 40, in place of identifying the parts that have reached their lives, when either of the acquired data corresponding to the parameters has reached its limit value.

Moreover, the main control unit 40 has a memory device 41 and the data of the parameter as described above are accumulated in a time series within the memory device 41. The main control unit 40 is so arranged as to estimate the timing when the data of each parameter amounts to its limit value on the basis of the data accumulated in a time series. As an example, a description will be made of the method for estimating the timing of the high voltage value reaching its limit value on the basis of the data of the high voltage values (HV) accumulated in a time series with reference to FIG. 2

FIG. 2 is a graph showing the relationship of the high voltage values to be applied to the discharging electrode (discharging applied voltage) within the laser chamber (vertical axis) vs. the oscillating pulse number P of the laser (horizontal axis). The gases of the excimer laser are usually required to be exchanged with new ones as they would have amounted to the life determined by the pulse number of the gases in the process of use and the time during which to use the gases. On the other hand, the exposure apparatus is using a pulse energy at a constant level so that, as the gases deteriorate, the voltage to be applied to the excimer laser should become higher in order to sustain the emission of the constant energy.

However, it can be noted that, as the exchange of the gases has been repeated, the applied voltage (as indicated by "X" in the table above) required for sustaining the constant pulse energy becomes gradually higher as the deterioration of the chamber, narrow-banding module, window or beam splitter advances. Therefore, the timing when the discharging applied voltage amounts to the limit value can be estimated on the basis of the minimum values of the discharging applied voltage stored in a time series, as shown in FIG. 2, by understanding the tendency in which the minimum applied voltage values are caused to arise.

In order to estimate the timing of the parameters amounting to their limit values, it is preferred that the data is acquired always under the same conditions. In many occasions, the exposure apparatus has the gases exchanged, for example, at the intervals of every five to seven days. It is convenient that the data of each parameter be acquired whenever the gases are exchanged. If the such data is acquired at every occasion of the exchange of the gases, a great number of the data can be accumulated with ease so that the timing for each parameter reaching its limit value can be estimated with a high degree of precision. Although it may take approximately 15 minutes to effect one job for exchanging gases, a decrease in throughput of the exposure apparatus may be little caused because each data can be acquired within a very short time immediately after the exchange of the gases has been effected.

The method for determining the life of the laser light source according to the present invention in the manner as described hereinabove can be resident in the main control unit 40 as software so that the data necessary for every occasion can be automatically acquired after the exchange of the gases. Further, it is also possible to install the software In the control unit 12 of the excimer laser light source 10.

It is further to be noted that the present invention can encompass a number of modifications and variations within the scope of the invention, in addition to the embodiments as described hereinabove.

For example, in the embodiment as described hereinabove, the exposure apparatus is so arranged so to acquire the data of each parameter immediately after the exchange of gases has been finished. However, it is also possible as a matter of course that, for example, the data can be acquired at the time other than the exchange of the gases, for instance, at the time when no excimer laser light source is used in a sequence of exposure.

Further, in the embodiment as described hereinabove, the exposure apparatus is so arranged as to acquire the data of each parameter by oscillating the excimer laser light source 10 at a mode where the energy for use in the usual exposure action is maintained constant. However, the data can also be acquired at a mode where the voltage is maintained constant. This can allow a better and precise understanding of the state of the oscillation of the eximer laser light source 10.

In instances where there is the occasion that the state of the oscillation of the excimer laser light source 10 does not become stable immediately after the exchange of the gases, it may be possible to acquire the data, for example, after the laser has been oscillated preliminarily for a predetermined period of time, e.g. for several minutes.

Moreover, in instances where there are the cases where the part that has reached its life cannot be identified only on the basis of the data of the parameters as illustrated in the embodiment as described hereinabove, it is also possible as a matter of course to set more parameters to acquire more detailed data.

The present invention has of course only been described and shown by way of explanatory example which is in no wise limiting and that any useful modification may be made thereto particularly in the field of technical equivalencies without departing from the scope of the invention.

What is claimed is:

1. A method for determining the life of a laser light source based on acquiring data for emitting laser light for use in an exposure apparatus, comprising the steps of:
    acquiring information for learning a periodical variation in said laser light source; and
    estimating the life of said laser light source on the basis of said information.

2. The method as claimed in claim 1, wherein said information is acquired on a regular basis.

3. The method as claimed in claim 1, wherein said information is acquired in accompany with work for exchanging gases at the time of exchanging gases of said laser light source.

4. The method as claimed in claim 1, wherein said laser light is pulse light; and said information comprises information corresponding to at least one of high voltage to be applied to a discharging voltage of said laser light source, a spectrum line width of said pulse light, stability of pulse energy of said pulse light, and a number of emission of said pulse light.

5. The method as claimed in claim 1, wherein the life of said laser light source is determined by comparing a value corresponding to said information with a preset limit value.

6. A method for maintaining a laser light source for emitting laser light for use in an exposure apparatus, comprising the steps of:
    acquiring information relating to maintenance of said laser light source; and
    estimating a timing for maintenance of said laser light source on the basis of the information acquired.

7. The method as claimed in claim 6, wherein said information relating to maintenance is acquired on a regular basis.

8. The method as claimed in claim 6, further comprising the step of storing said information relating to maintenance in a time series;
    wherein estimate of the timing for maintenance is implemented on the basis of said information stored in a time series.

9. The method as claimed in claim 8, wherein a value of voltage to be applied to said laser light source is stored in a time series as said information relating to maintenance; and estimate of said timing of maintenance is implemented on the basis of said value of voltage stored in a time series.

10. The method as claimed in claim 6, wherein said laser light is excimer pulse light.

11. The method as claimed in claim 6, wherein said maintenance includes exchange of a part of said laser light source or inspection of said laser light source.

12. The method as claimed in claim 6, wherein said information is information corresponding to at least one of a value of voltage to be applied to said laser light source, a spectrum width of said pulse light, and an energy of said pulse light.

13. The method as claimed in claim 6, further comprising the step of exchanging gases of said laser light source for activating said laser light.

14. A method for maintaining a laser light source for emitting laser light for use in an exposure apparatus, comprising the steps of:
    acquiring information relating to maintenance of said laser light source; and
    identifying an object of maintenance on the basis of the information acquired.

15. The method as claimed in claim 14, wherein said maintenance includes exchange of a part of said laser light source or inspection of said laser light source.

16. The method as claimed in claim 14, wherein said laser light source includes a plurality of parts; and at least one of said plurality of parts is identified as the object of maintenance.

17. The method as claimed in claim 16, wherein said plurality of parts includes at least one of a laser chamber, a band-narrowing module, a mirror member and a beam splitter.

18. The method as claimed in claim 14, wherein said information is information corresponding to at least one of a value of voltage to be applied to said laser light source, a spectrum width of said pulse light, and an energy of said pulse light.

* * * * *